United States Patent
Rochin Machado et al.

(10) Patent No.: US 10,784,658 B2
(45) Date of Patent: Sep. 22, 2020

(54) MOBILE POWER GENERATION RESTRAINT ASSEMBLY

(71) Applicant: General Electric Company, Schenectady, NY (US)

(72) Inventors: Jorge Mario Rochin Machado, Querétaro (MX); Jordan Scott Warton, Baytown, TX (US); David Garza-Maldonado, Querétaro (MX); Michael Anthony Acosta, Houston, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/123,701

(22) Filed: Sep. 6, 2018

(65) Prior Publication Data

US 2020/0083676 A1  Mar. 12, 2020

(51) Int. Cl.
*A47B 97/00* (2006.01)
*H02B 1/54* (2006.01)
*H02B 1/01* (2006.01)
*H02B 1/52* (2006.01)

(52) U.S. Cl.
CPC ................. *H02B 1/54* (2013.01); *H02B 1/01* (2013.01); *H02B 1/52* (2013.01)

(58) Field of Classification Search
CPC ......... H02B 1/01; B65G 69/003; F02B 63/04; B60P 3/36
See application file for complete search history.

(56) References Cited

U.S. PATENT DOCUMENTS

| | | | | |
|---|---|---|---|---|
| 3,933,372 A * | 1/1976 | Herndon | .................... | B60P 3/36 280/763.1 |
| 6,634,615 B1 | 10/2003 | Bick et al. | | |
| 9,139,060 B2 * | 9/2015 | Armstrong | ............... | B60D 1/66 |
| 2003/0057704 A1 * | 3/2003 | Baten | ...................... | F02B 63/04 290/3 |
| 2006/0051196 A1 * | 3/2006 | McDonald | ........... | B65G 69/005 414/809 |
| 2006/0099045 A1 * | 5/2006 | Sawchuk | .................. | B60P 7/08 410/103 |
| 2009/0283999 A1 * | 11/2009 | Andersen | ............. | B65G 69/003 280/762 |
| 2014/0285005 A1 * | 9/2014 | Casteel | ................... | H02S 10/40 307/23 |
| 2018/0306121 A1 * | 10/2018 | Curlier | .................... | F01D 15/12 |

* cited by examiner

*Primary Examiner* — Amy J. Sterling
(74) *Attorney, Agent, or Firm* — Fletcher Yoder, P.C.

(57) ABSTRACT

A restraint assembly includes a plurality of tensile restraints and a plurality of restraints. Each tensile restraint of the plurality of tensile restraints is configured to couple to a respective anchor plate of a plurality of anchor plates disposed on one or more foundations, and a mobile system. The mobile system is disposed on the one or more foundations. Each restraint includes a rigid element configured to couple to a respective anchor plate of the plurality of anchor plates, and to interface with or couple to a respective location on the mobile system.

21 Claims, 7 Drawing Sheets

MOBILE POWER GENERATION RESTRAINT ASSEMBLY

BACKGROUND OF THE INVENTION

The subject matter disclosed herein relates to mobile systems, and more particularly to systems and methods for installing a mobile power plant system.

Typically, permanent power plants are built to provide power to customers connected to a power grid. However, there are a variety of reasons that the permanent power plant may not be able to meet the power demand of the customers. For example, in periods of intense growth, the demand by customers may increase to surpass the amount of power the permanent power plant can generate. In some cases, the permanent plant may be shut down or undergo equipment maintenance. As further example, natural disasters such as hurricanes and earthquakes can disrupt power for a portion of the customers. Mobile power plants may be transported to an environment to meet power demands of customers where permanent power plants may not be able to deliver power, or may not be able to deliver power efficiently. However, environmental conditions, such as wind and seismic conditions, may prohibit installation or operation of mobile power plants at some sites.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a mobile system includes a first trailer, a second trailer, and a restraint assembly. The first trailer is disposable at a first position on a foundation and includes a first component disposed along a first axis. The second trailer includes a second component disposed along a second axis. The restraint assembly includes a plurality of restraints arranged around the first trailer and the second trailer, wherein the restraint assembly is configured to maintain an orientation of the first axis relative to the second axis. The restraint assembly is configured to maintain the first trailer at the first position relative to the foundation.

In a second embodiment, a restraint assembly includes a plurality of tensile restraints and a plurality of restraints. Each tensile restraint of the plurality of tensile restraints is configured to couple to a respective anchor plate of a plurality of anchor plates disposed on one or more foundations, and a mobile system. The mobile system is disposed on the one or more foundations. Each restraint includes a rigid element configured to couple to a respective anchor plate of the plurality of anchor plates, and to interface with or couple to a respective location on the mobile system.

In a third embodiment, a method includes installing a plurality of anchor plates on one or more foundations and installing a plurality of restraints of a restraint assembly. The plurality of anchor plates are installed around a plurality of trailers of a mobile system that are disposed on the one or more foundations. Installing the plurality of restraints includes coupling each restraint to an anchor plate of the plurality of anchor plates, and arranging each restraint to interface with or couple to a respective location of a trailer of the plurality of trailers. The plurality of restraints is configured to maintain an orientation of a first trailer of the plurality of trailers relative to a second trailer of the plurality of trailers. The plurality of restraints includes tensile restraints, interface restraints, fastened restraints, axial restraints, or any combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
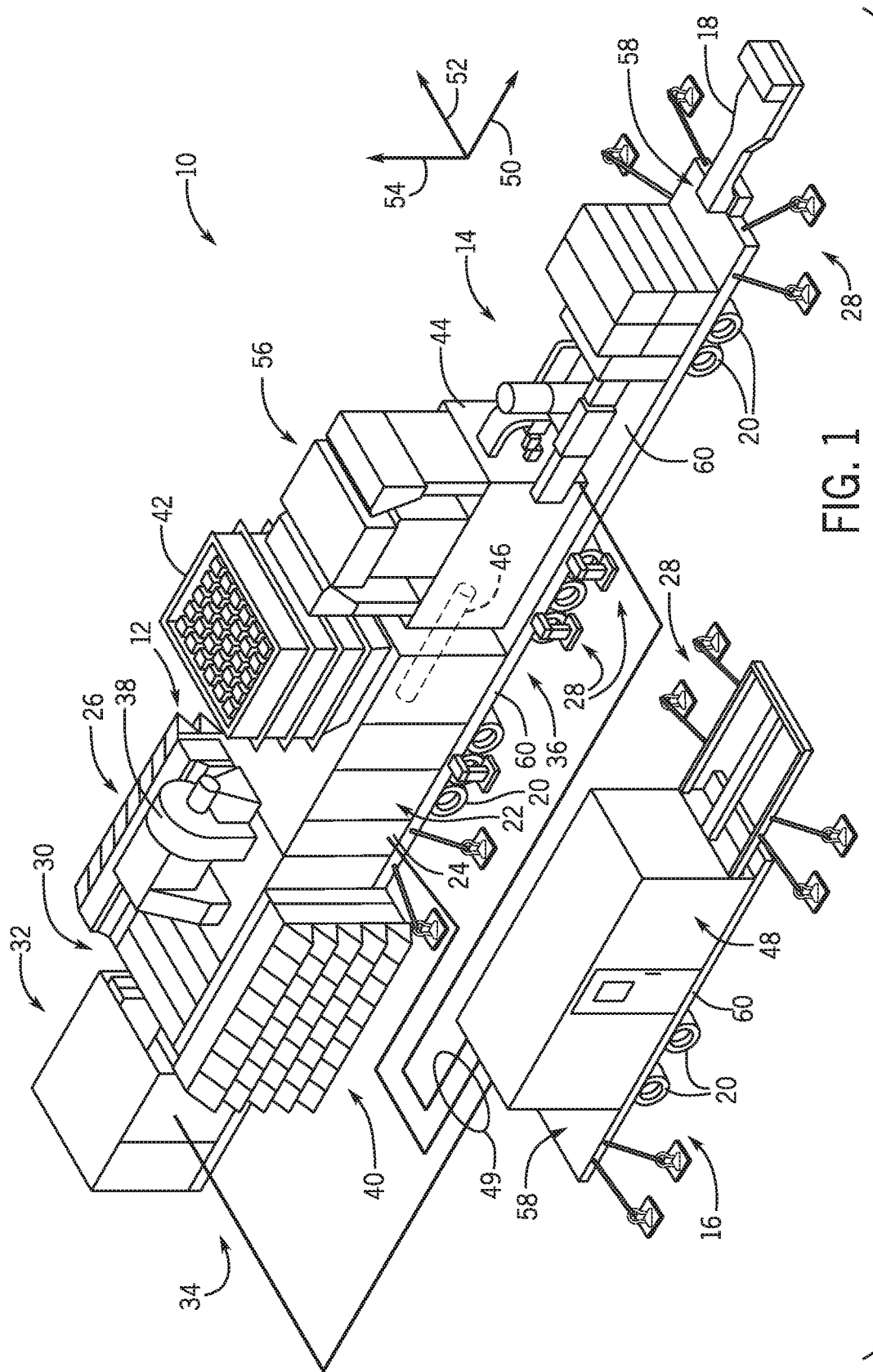
FIG. 1 is a perspective view of an embodiment of a mobile power plant system and a restraint assembly.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Mobile power plant systems may be deployed to a variety of locales to provide power for use at remote locations and/or to supplement an existing portion of a power grid. Mobile power plant systems may be rapidly deployed to a site and commissioned to provide power much more quickly than permanent power plants. Trailers may be used to facilitate the transport of components of the mobile power plant system to the site, and the trailers may be used to support the components during operation. The mobile power plant may be installed on one or more foundations at the site. The mobility of the trailers during a transport phase and an installation phase facilitates the speed of deployment at the site. However, movement after installation of the mobile power plant system may be undesirable. Embodiments of the restraint assembly described below may be used to maintain the desired arrangement of the trailers relative to the one or more foundations at the site despite conditions that may exert forces on the mobile power plant system. The restraint assembly may be configured to transfer loads (e.g., wind, seismic) on trailers of the mobile power plant system to the one or more foundations at the site. That is, the restraint assembly may be configured to reduce or eliminate movement of the trailers of the mobile power plant system from wind and seismic conditions at a site that may otherwise preclude installation and continued operation of the mobile power plant at that site. Moreover, the restraint assembly may enable the mobile power plant system 10 to satisfy one or more building codes including, but not limited to the International Building Code 2015 requirements for static structures. The restraint assembly may be configured to couple with or to interface with existing features (e.g., openings, loops, hooks, posts) of the trailers of the mobile power plant system, thereby reducing processing (e.g., cutting, drilling) prior to installation of the restraint assembly. Moreover, the restraint assembly may be configured for installation with new or existing mobile power plant systems.

FIG. 1 is a perspective view of an embodiment of an installed mobile power plant system 10. The mobile power plant system 10 includes multiple trailers 11, such as a turbine trailer 12, a generator trailer 14, and a control house trailer 16. Each trailer 11 may be configured to transport one or more components of the mobile power plant system 10 to an installation site. In some embodiments, one or more of the trailers 11 may be coupled to tractors or trucks to be moved to the installation site. Additionally, or in the alternative, the one or more trailers 11 may be transported via aircraft to a place near the installation site. Movement of the one or more components of the mobile power plant system 10 via the trailers 11 may allow for quicker installation time, lower installation cost, and greater mobility, as further described in detail below.

In certain embodiments, the mobile power plant system 10 may enable power needs of industrial businesses to be met on site without constructing a traditional power plant. For example, the mobile power plant system 10 may be utilized in settings such as an industrial operation or emergency site (e.g., a blackout, brownout, a natural disaster such as a flood, hurricane, or earthquakes, etc.). Accordingly, the mobile power plant system 10 may include a plurality of wheels 20 disposed beneath each of the trailers 11 (e.g., the turbine trailer 12, the generator trailer 14, the control house trailer 16) to enable efficient transportation and installation. In certain embodiments, the trailers 11 may include a modular design that enables faster installation on site. Specifically, various components of the mobile power plant system 10 may be mounted on one or more trailers 11 and transported (e.g., via sea, land, air) such that the mobile power plant system 10 can be deployed and commissioned quickly once it arrives to its designated site to provide power. In particular, in certain embodiments, the arrangement of the components of the mobile power plant system 10 between each of the one or more trailers 11 may help reduce the time and cost associated with transporting the mobile power plant system 10 to the installation site.

In certain embodiments, the trailers 11 may include various features that enable efficient transportation to the designated site. For example, each one of the trailers 11 may include one or more steerable axles that help improve mobility on land by minimizing a turning circle. Further, it should be noted that the axles span of each one of the trailers 11 may be easily adjusted to meet the regulatory standards of a particular country. In certain embodiments, each one of the trailers 11 may include an air ride suspension system that may be configured to assist in adjusting a quick alignment (and/or docking procedure) between one or more of the trailers 11. In particular, each one of the trailers 11 may include various features that enable weight (e.g., weight from components supported by the trailers 11) distribution on the trailers 11. For example, the weight distribution may be determined based on country regulations, on a number and/or type of axle, on the structure of the trailer 11, on the number and/or type of components to be transported, or a combination thereof. For example, in certain embodiments, the components of the mobile power plant system 10 may be arranged on the trailers 11 based on the number and weight of components to be transported and the available axles (e.g., each axle may support a different amount of weight) and/or structure (e.g., a gooseneck 18 on the trailer 11 may support additional weight).

In certain embodiments, the turbine trailer 12 may be configured to transport a turbine 22 (e.g., a gas turbine engine, a steam turbine, a hydroturbine, a wind turbine, or any turbine system) to an installation site. For example, the gas turbine engine disposed within an enclosure 24 may be mounted on the turbine trailer 12. Further, an air intake section 26 with a housing 30 may be mounted on the turbine trailer 12. In certain embodiments, an auxiliary skid 32 may be disposed at a first end 34 (e.g., opposite a second end 36) of the turbine trailer 12. For example, in the illustrated embodiment, the auxiliary skid 32 may be mounted on an attachment of the turbine trailer 12, such as over the gooseneck 18 of the turbine trailer 12. In certain embodiments, the auxiliary skid 32 may be disposed at the second end of the turbine trailer 12, and may be mounted on an attachment. In certain embodiments, additional support systems (e.g., lubrication system, water wash system, hydraulics system, fluid injection system, coolant system, fuel system, thermal/clearance system) may be disposed within the enclosure 24, and/or may be coupled or integrated within the gas turbine engine. In some embodiments, the turbine trailer 12 may include a vent system 38 configured to ventilate the space surrounding the gas turbine engine, such as within the housing 30 or the enclosure 24. A filter assembly 40 of the turbine trailer 12 may be configured to couple with the air intake section 26 and the vent system 38. The filter assembly 40 may be configured to filter and intake the air flow into the gas turbine engine. Additionally, an exhaust stack 42 (e.g., conduit, silencer, emissions control equipment) may be coupled to the turbine and may be configured to discharge an exhaust gas from the gas turbine engine.

The turbine 22 may drive a load on the same trailer and/or another trailer. A load of the mobile power plant system 10 driven by the turbine 22 may include a generator 44. In the illustrated embodiment, the generator 44 is configured to generate power for the mobile power plant system 10. The generator 44 may be mounted on the generator trailer 14. In certain embodiments, various other components (e.g., switch gear, heat exchanger, etc.) may be mounted on the generator trailer 14. For example, in certain embodiments, a switch gear configured to connect the generator 44 to the power grid may be mounted on the generator trailer 14. As a further example, a heat exchanger configured to cool generator lube oil may be mounted on the generator trailer 14. The generator trailer 14 may include an air vent system 56 configured to ventilate the space surrounding the generator 44.

The turbine 22 (e.g., gas turbine engine) may be removably coupled to the generator 44 via a common shaft 46. The common shaft 46 may drive the generator 44. In particular, during an installation phase, the generator 44 may be aligned with the turbine 22 via the generator trailer 14 and the turbine trailer 12, respectively. Further, the generator 44 may be removably coupled to the turbine 22 during a docking process of the installation phase. As discussed in detail below, a restraint assembly 28 may be coupled to the trailers 11 of the mobile power plant system 10 to maintain alignment of the generator 44 with the turbine 22 despite external loads on the system that may vary over time. The shaft 46 may be oriented along a system axis 50. The restraint assembly 28 may be configured to reduce or eliminate movement of the trailers 11 of the mobile power plant system 10 along the system axis 50, one or more lateral axes 52 along a surface of the installation site, along a vertical axis 54, or any combination thereof. For example, the restraint assembly 28 may be configured to limit movement of the turbine trailer 12 relative to the generator trailer 14 to maintain alignment of the common shaft 46 coupled to both trailers 12, 14. Additionally, the restraint assembly 28 may be configured to reduce or eliminate movement of the trailers 11 relative to the one or more foundations.

The control house trailer 16 may include a control system configured to monitor and/or regulate the operations of the mobile power plant system 10. For example, the control house trailer 16 may include a battery system, a fire suppression system (e.g., firewalls), a charging system, and/or other systems for controlling or regulating the operations of the mobile power plant system 10. For example, a control system 48 may be configured to receive and process feedback via control lines 49 from turbine 22, the auxiliary skid 32, the generator 44, or any combination thereof. In some embodiments, the restraint assembly 28 may be coupled to the control house trailer 16 to maintain a position of the control house trailer 16 on the one or more foundations at the installation site relative to other components at the installation site despite external loads (e.g., wind loads, seismic loads) on the control house trailer 16.

One or more of the trailers 11 of the mobile power plant system 10 include a deck 58 configured to support the elements disposed on the respective one or more trailers 11. The deck 58 of each trailer 11 may be supported by a chassis 60 (e.g., frame) coupled to the wheels 20. The deck 58 of the turbine trailer 12 may be configured to support turbine components of the turbine trailer 12, such as the air intake section 26 and the turbine 22 components. The deck 58 of the generator trailer 14 may be configured to support generator components of the generator trailer 14, such as the generator 44 and the air vent system 56. In some embodiments, elements of the restraint assembly 28 may be coupled to portions the deck 58 of a trailer 11. Additionally, or in the alternative, elements of the restraint assembly 28 may be coupled to portions of the chassis 60.

Figure 2:
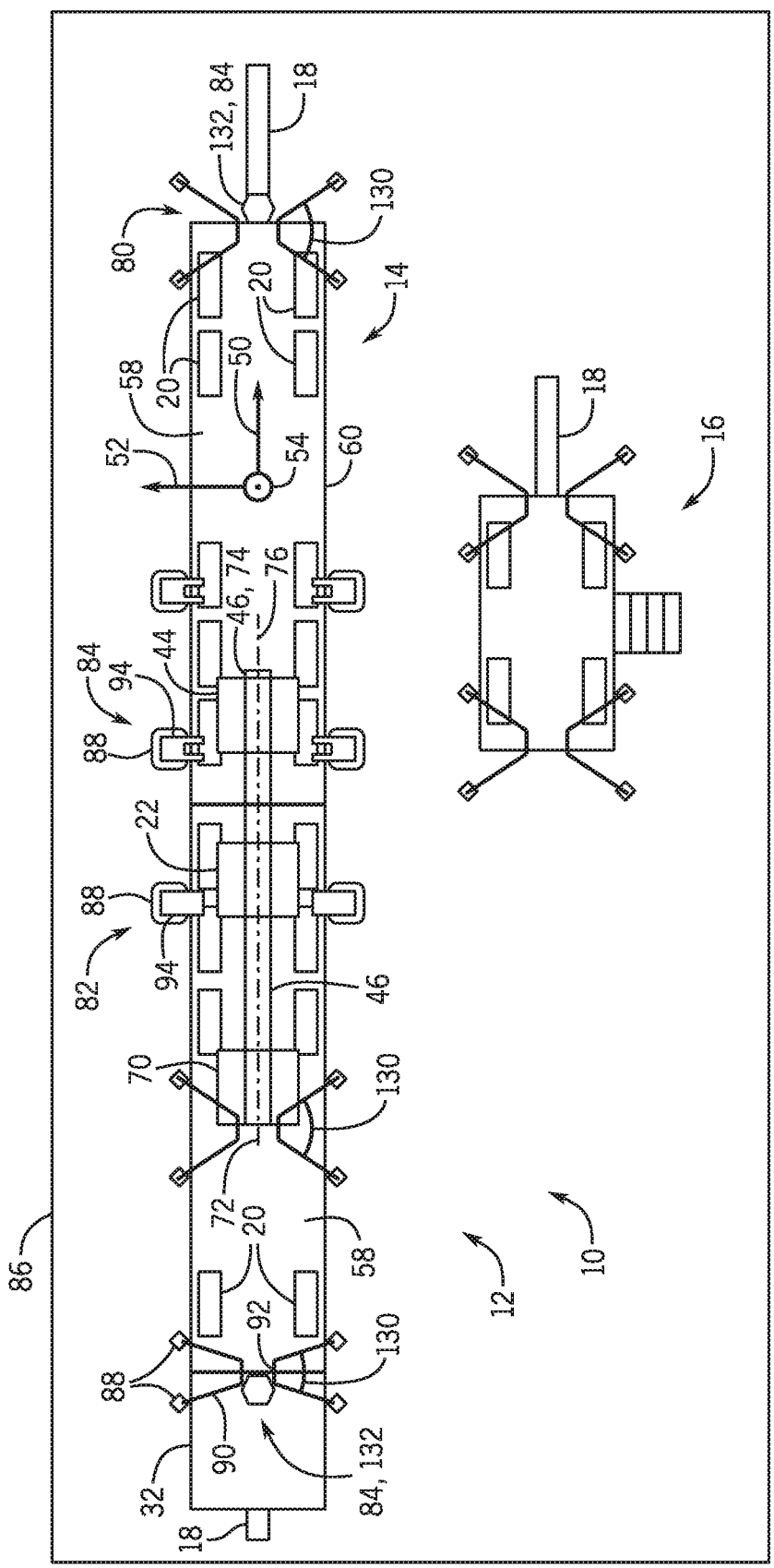
FIG. 2 is a top view of an embodiment of the mobile power plant system and the restraint assembly.

FIG. 2 illustrates a top view of an embodiment of the mobile power plant system 10 with the turbine trailer 12, the generator trailer 14, and the control house trailer 16. It may be appreciated that FIG. 2 simplifies the illustration of the trailers 11 and their respective components for clarity to illustrate the restraint assembly 28. The turbine 22 of the turbine trailer 12 may drive one or more loads via the shaft 46. Rotation of the turbine 22 may drive the shaft 46 and a compressor 70 coupled to the shaft 46 around a trailer axis 72. The generator 44 may be driven by a generator shaft 74 around a generator axis 76. The generator shaft 74 may be an extension of the shaft 46 of the turbine trailer 12, or a separate shaft coupled to the shaft 46. The restraint assembly 28 may be configured to maintain a relationship (e.g., coaxial orientation) of the generator axis 76 with the trailer axis 72 through the turbine 22. Additionally, the restraint assembly 28 may be configured to maintain a spacing between the turbine 22 of the turbine trailer 12 and the generator 44 of the generator trailer 14 by maintaining a relationship between the turbine trailer 12 and the generator trailer 14 on the one or more foundations.

The shafts and components coupled to the shafts of the trailers 11 of the mobile power plant system 10 may be exposed to large loads and/or high rotational speeds. Maintaining the relative position and orientation of the trailers 11 with respect to one another on the one or more foundations at the installation site via the restraint assembly 28 may reduce friction, fatigue, or failure of the rotating components of the mobile power plant system 10, thereby increasing the efficiency of the mobile power plant system 10. The restraint assembly 28 may enable the mobile power plant system 10 to operate despite environmental conditions (e.g., winds of 30, 60, 90, or 120 mph or more; seismic events of 0.1 g, 0.25 g, 0.5 g, 0.65 g, or more) that may cause the shutdown of conventional mobile systems. Moreover, the restraint assembly may enable the mobile power plant system 10 to satisfy one or more building codes for static structures.

The restraint assembly 28 may include one or more types of restraints. For example, the restraint assembly 28 may include one or more tensile restraints 80, one or more fastened restraints 82, one or more interface restraints 84, or any combination thereof. The restraint assembly 28 may couple portions of the trailers 11 to one or more foundations 86 at the installation site. In some embodiments, a first portion of each restraint of the restraint assembly 28 is coupled to one of the foundations 86 at the installation site, and a second portion of each restraint of the restraint assembly 28 is coupled to a location on one of the trailers 11 of the mobile power plant system 10. In some embodiments, an anchor plate 88 of a restraint is coupled to the foundation 86 via one or more fasteners (e.g., anchors, bolts, nails, pins, screws) that are at least partially inserted into the foundation 86. A second portion of each restraint of the restraint assembly 28 interfaces with a location (e.g., one or more surfaces) of the respective trailer 11. The restraints of the restraint assembly 28 may couple to or interface with locations of the chassis 60 or the deck 58 of the trailers 11.

As discussed in detail below, a tensile member 90 of a tensile restraint 80 couples the trailer 11 to the foundation 86. The tensile member 90 may include, but is not limited to a cable, a strap, or a rod. In some embodiments, the tensile members 90 of the restraint assembly 28 include hooks, eyes, or enclosures to secure ends of the tensile member 90 to the anchor plate 88 and the trailer 11. In some embodiments, the tensile members 90 of the restraint assembly 28 couple the trailer 11 to the foundation 86 without a turnbuckle. In some embodiments, the tensile member 90 extends from a first anchor plate 88, through a portion (e.g., opening) of the trailer 11, and to a second anchor plate 88. Additionally, or in the alternative, the tensile member 90 couples the anchor plate 88 to a lashing member 92 at a location on the trailer 11. The lashing member 92 may be an existing feature (e.g., loop, opening, hook, post) of the trailer 11, or a separate element coupled to the trailer 11.

The fastened restraints 82 and the interface restraints 84 may have one or more rigid elements 94. As discussed herein, a rigid element may include, but is not limited to a beam, post, pole, channel, or column member that is configured to transfer loads from the trailer 11 to the foundation 86 without yielding to a point of plastic deformation of the rigid element. The rigid elements discussed herein may be configured to support compression, tensile, or shear loads, or any combination thereof. A first end of the rigid element 94 of the fastened restraint 82 and the interface restraint 84 may be coupled to an anchor plate 88. A second end of the rigid element 94 of the fastened restraint 82 may be fastened to respective location on the trailer 11. For example, the second end of the rigid element 94 of the fastened restraint 82 may be bolted to the chassis 60 or the deck 58. As discussed herein, each of the fastened restraints 82 may restrict movement of the trailer 11 along multiple axes (e.g., system axis 50, lateral axis 52, vertical axis 54). That is, the second end of the rigid element 94 of the fastened restraint 82 may form a fixed joint with the trailer 11. A second end of the interface restraint 84 may interface with one or more surfaces of the trailer 11, such as surfaces of the chassis 60 or the deck 58. The interface restraints 84 may provide one or more degrees of freedom for the trailer 11. For example, one of the interface restraints 84 may restrain the trailer 11 along one or more lateral axes 52 relative to the interface restraint 84, yet the trailer 11 may have more movement (e.g., flex) allowed along the vertical axis 54 relative to the interface restraint 84.

Figure 3:
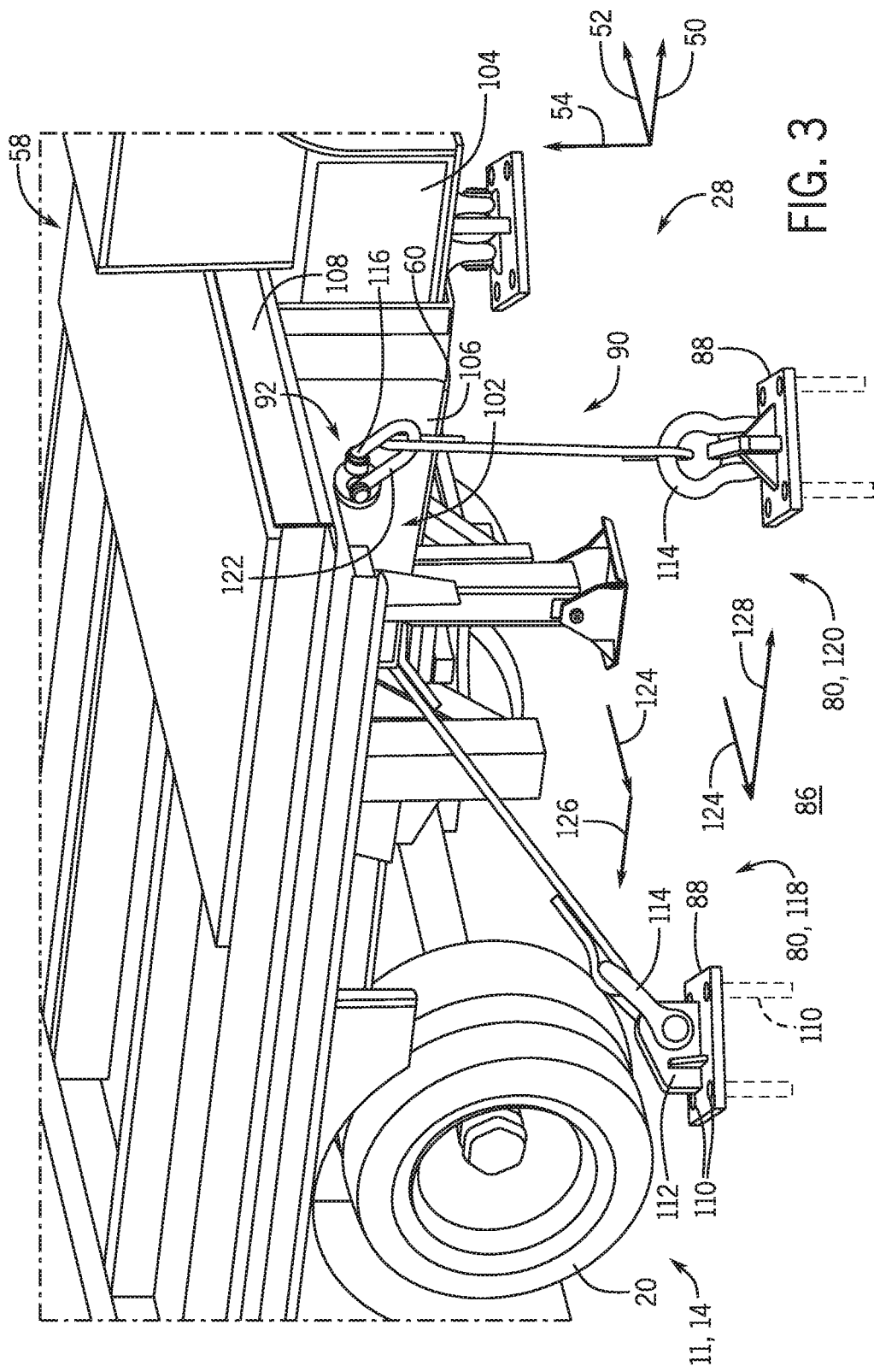
FIG. 3 is a perspective view of an embodiment of tensile restraints of the restraint assembly.

FIG. 3 illustrates a perspective view of an embodiment of a trailer 11 (e.g., generator trailer 14) with tensile restraints 80. In some embodiments, multiple tensile restraints 80 are coupled to a location of the trailer 11. For example, FIG. 3 illustrates a pair of tensile restraints 80 coupled to first location 102 of the trailer 11. The chassis 60 of the trailer 11 may include one or more beams 104 that extend longitudinally along the trailer 11 and one or more wings 106 that extend substantially perpendicular to the beams 104. The wings 106 and/or the beams 104 are coupled to the axles and wheels 20 of the trailer 11, and are configured to support the deck 58. In some embodiments, the deck 58 includes edges 108 that extend around the trailer 11. The tensile restraints 80 may be coupled to locations on the beams 104, wings 106, deck 58, or edges 108 of the trailer 11.

As described above, the tensile restraints 80 are coupled to lashing members 92 at locations on the trailer 11. In some embodiments, the lashing member 92 includes a shaft 116 that extends through an opening of one of the wings 106 of the chassis 60. The shaft 116 may extend through an existing feature (e.g., opening) of the chassis 60, thereby enabling use of the tensile restraint 80 of the restraint assembly 28 with the trailer 11 without structural modification of the trailer 11. The lashing member 92 may be at a location of the trailer 11 that is configured to support the loads from the tensile restraints 80 during a high wind or seismic event. For example, a location for the lashing member 92 on the wing 106 near the beam 104 may enable higher loads than a lashing member 92 near an edge 108 of the trailer 11 or a lashing member 92 on the deck 58.

The shaft 116 of the lashing member 92 may be coupled to two or more tensile members 90. For example, a first tensile restraint 118 and a second tensile restraint 120 of the restraint assembly 28 may be coupled to opposite ends of the shaft 116 of the lashing member 92 that extends through an opening of the wing 106 of the chassis 60, as shown in FIG. 3. One or more enclosures 122 coupled to the shaft 116 may facilitate coupling the tensile member 90 to the lashing members 92. Where multiple tensile restraints 80 are coupled to a common lashing member 92, the tensile restraints 80 may be configured to restrain the trailer 11 from movement in different directions. For example, the first restraint 118 is configured to restrain the trailer 11 in a first direction 124 and a second direction 126. The second restraint 120 is configured to restrain the trailer 11 in the first direction 124 and a third direction 128 that is substantially opposite the second direction 126. As illustrated in FIG. 2, the tensile restraints 80 coupled to the common lashing member 92 may be oriented an angle 130 relative to one another. The angle 130 may be between approximately 20 to 135 degrees, such as approximately 45 degrees or approximately 90 degrees.

The anchor plates 88 of the restraint assembly 28 may have multiple fasteners 110 to couple the anchor plates 88 to the foundation 86. For example, the anchor plates 88 of the tensile restraints 80 may each have four fasteners 110. Flanges 112 of the anchor plates 88 may couple to the tensile members 90. For example, a cable tensile member 90 may loop through an enclosure 114 coupled to the flange 112 of the anchor plate 88. The enclosure may include a U-bolt, eye, or clamp configured to receive the tensile members 90. The tensile member 90 of the tensile restraint 80 may be loaded in tension during installation of the restraint assembly 28 after the trailer 11 has been arranged at a desired position on the foundation 86. The tensile restraint 80 may facilitate maintaining a respective position of the trailer 11 on the one or more foundations at the installation site relative to other trailers 11 at the installation site. In some embodiments, after installation of the tensile restraints 80, the tensile members 90 may be loaded with 500, 1000, 2000, or 5000 lbs or more in tension.

Figure 4:
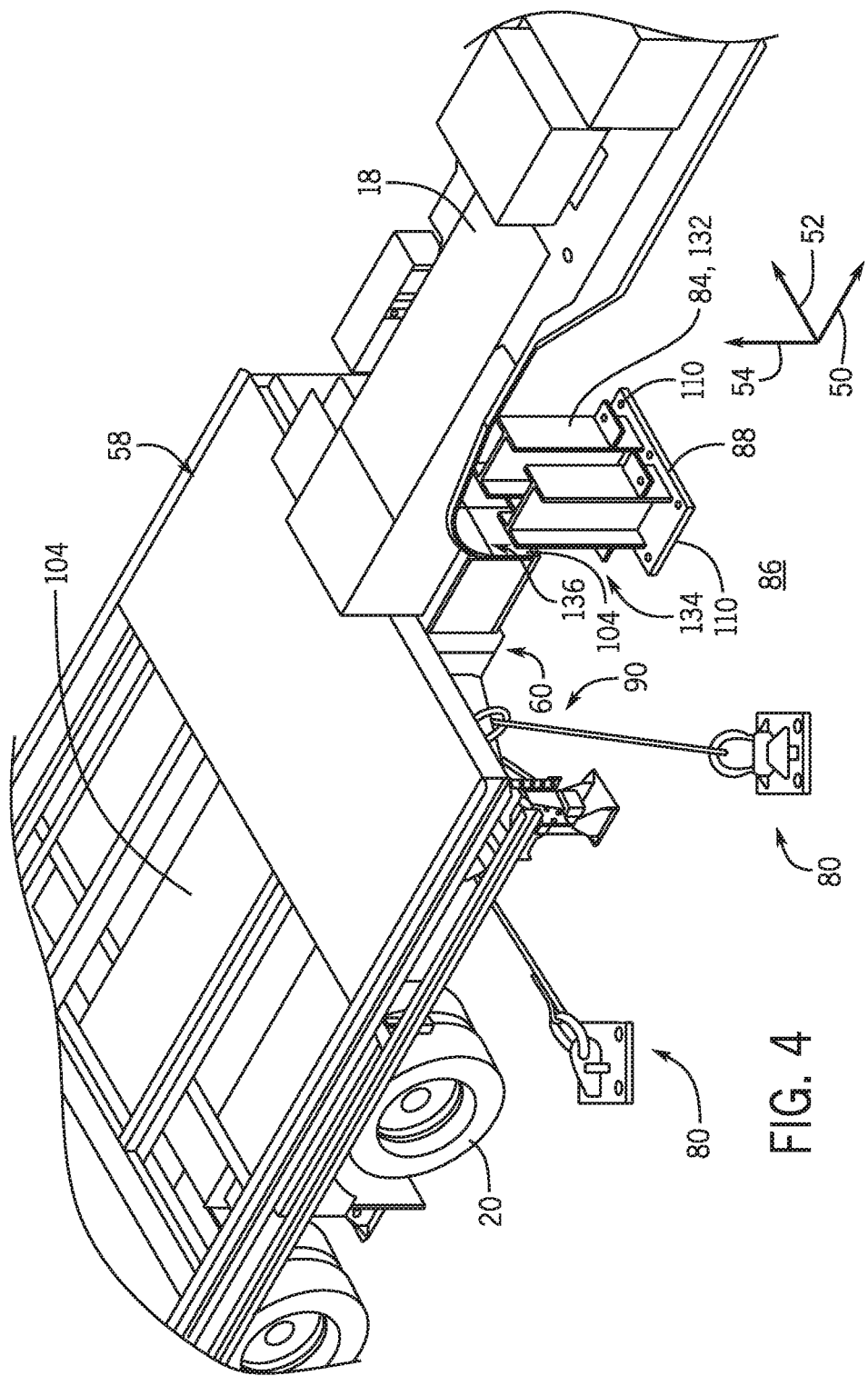
FIG. 4 is a perspective view of an embodiment of tensile restraints and an axial restraint of the restraint assembly.

FIG. 4 illustrates a perspective view of an end of a trailer with the restraint assembly 28 having tensile restraints 80 and the interface restraint 84. In some embodiments, the one or more interface restraints 84 of the restraint assembly 28 include an axial restraint 132. The axial restraint 132 may be configured to interface with one or more beams 104 of the chassis 60, thereby restraining the movement of the trailer in at least one direction along the system axis 50. The axial restraint 132 may be configured to transfer loads from the trailer 11 to the foundation 86. The axial restraint 132 may be coupled to the foundation 86 via the anchor plate 88 and fasteners 110. In some embodiments, the axial restraint 132 is a rigid element 94 that interfaces with the chassis 60 of the trailer 11 without fasteners. For example, FIG. 4 illustrates the axial restraint 132 with two rigid elements 94 coupled to the anchor plate 88, where each of the rigid elements 94 (e.g., beam portions) has a face 134 configured to interface with the chassis 60. For example, FIG. 4 illustrates the faces 134 of the axial restraint 132 interfacing with a face 136 of the beam 104 of the chassis 60. In some embodiments, fasteners may be used to couple the one or more rigid elements 94 of the axial restraint 132 to the chassis 60, such that the axial restraint 132 is a fastened restraint 82. The use of fasteners with one or more rigid elements 94 are discussed in detail below with the fastened restraints 82. In some embodiments, the axial restraint 132 is disposed beneath the gooseneck 18, thereby restraining the trailer 11 along the system axis 50 without increasing a footprint of the trailer 11. In some embodiments, the axial restraint 132 may be installed to interface with the chassis 60 during installation of the restraint assembly 28 after the trailer 11 has been arranged at a desired position on the foundation 86.

Figure 5:
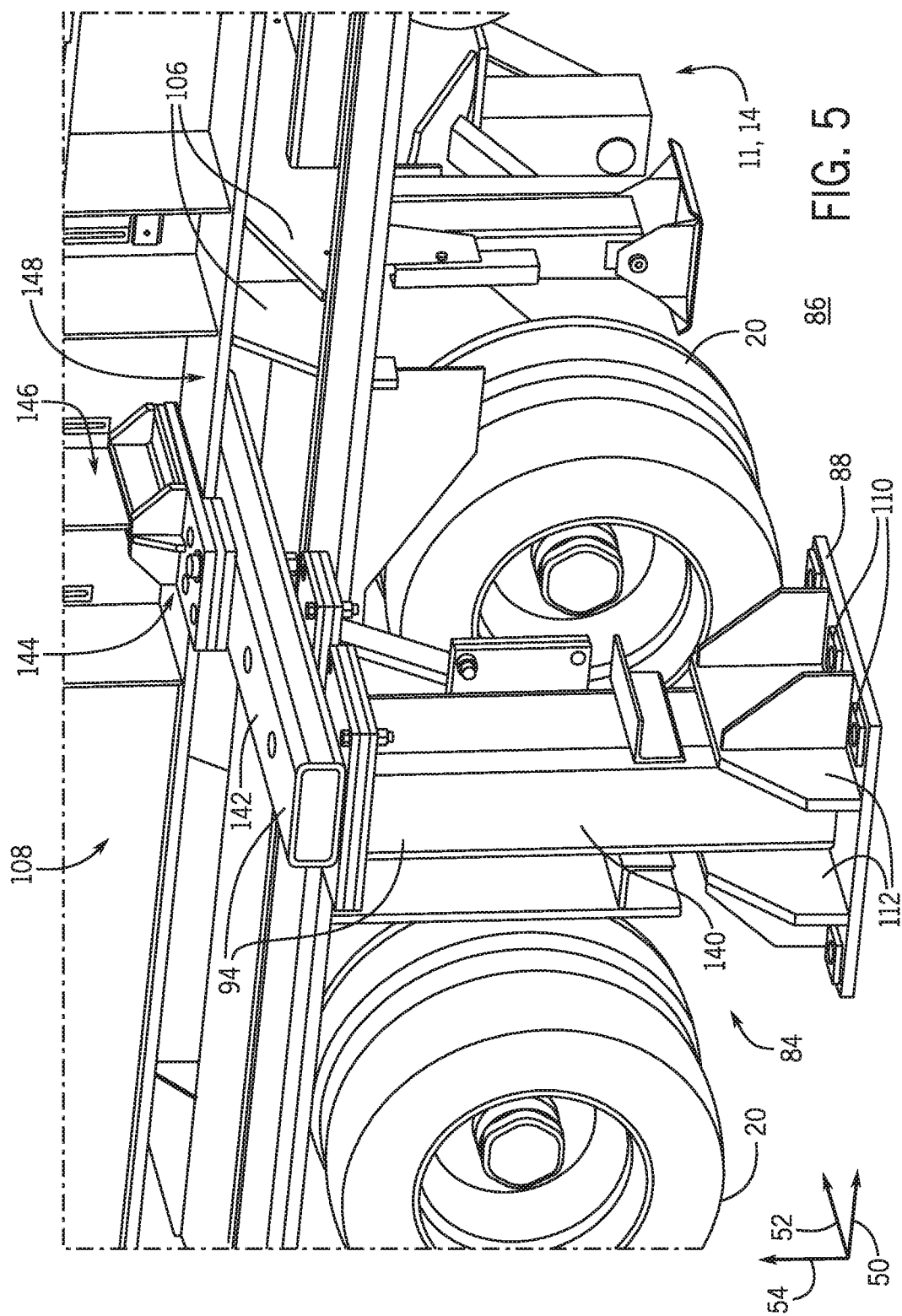
FIG. 5 is a perspective view of an embodiment of an interface restraint of the restraint assembly.

FIG. 5 illustrates a perspective view of an embodiment of the interface restraints 84. One or more rigid elements 94 of the interface restraint 84 may be coupled to the anchor plate 88 on the foundation 86. As discussed above, one or more fasteners 110 couple the anchor plate 88 to the foundation 86. A first rigid element 140 of the interface restraint 84 may be coupled to the anchor plate 88 and/or to flanges 112 of the anchor plate 88. A second rigid element 142 of the interface restraint 84 may couple to the first rigid element 140 and interface with one or more surfaces of the trailer 11. In some embodiments, the second rigid element 142 is fastened or bolted to the first rigid element 140 of the interface restraint 84. The interface restraint 84 may interface with the deck 58, an edge 108 of the deck 58, or the chassis 60 (e.g., wing 106). As discussed above, the interface restraints 84 may be configured to restrain the trailer 11 along one or more directions and be configured to provide one or more degrees of freedom for the trailer 11. The interface restraints 84 may be configured to restrain movement of the trailer 11 at the location without utilizing fasteners to couple the interface restraint to the trailer. The interface restraints 84 may be configured to transfer loads from the trailer 11 to the foundation 86.

In some embodiments, the second rigid element 142 of the interface restraint 84 at least partially encloses one or more portions of the trailer 11 at the installed location. For example, a restraining end 144 of the interface restraint 84 may at least partially enclose a web 146 of the trailer 11, a flange 148 of the trailer 11, or any combination thereof. In some embodiments, the web 146 of the trailer 11 may be a part of the chassis 60 or the deck 58. Additionally, or in the alternative, the flange 148 of the trailer 11 may be a part of the chassis 60 or the deck 58. In some embodiments as illustrated in FIG. 5, the restraining end 144 of the interface restraint 84 receives a portion of the trailer 11 to interface with and restrain the trailer 11. At least partially enclosing a portion of the trailer 11 with the restraining end 144 may enable the interface restraint 84 to restrain movement of the trailer 11 in multiple directions without fasteners to couple the restraining end 144 to the trailer 11. In some embodiments, the restraining end 144 of the interface restraint 84 is received by a portion of the trailer 11 to interface with and restrain the trailer 11. That is, the restraining end 144 of the interface restraint 84 may be configured to mate with one or more portions of the trailer 11 to restrain movement of the trailer 11.

The interface restraint 84 may be installed to interface with the trailer 11 during installation of the restraint assembly 28 after the trailer 11 has been arranged at a desired position on the foundation 86. In some embodiments, the interface restraint 84 may be configured to interface with the trailer 11 near one or more wheels 20 of the trailer 11. In some embodiments of the mobile power plant system 10, the restraint assembly 28 may include multiple interface restraints 84. For example, the restraint assembly 28 for the generator trailer 14 may have 1, 2, 3, 4, or more interface restraints 84 on the sides of the generator trailer 14. As illustrated in FIG. 2, the restraint assembly 28 for the generator trailer 14 may include the four interface restraints 84 on the sides of the generator trailer 14 and the axial restraint 132 at an axial end of the generator trailer 14. The one or more of the interface restraints 84 may be configured to support compressive loads of more than 500, 1000, or 2000 lbs and/or shear loads of more than 500, 1000, or 2000 lbs during the seismic or wind event. In some embodiments, the restraining end 144 of the interface restraint 84 may enable the interface restraint 84 to support various loads during the seismic or wind event, such as tensile loads or bending loads. The interface restraint 84 may facilitate maintaining a respective position of the trailer 11 (e.g., generator trailer 14) on the one or more foundations at the installation site relative to other trailers 11 at the installation site.

Figure 6:
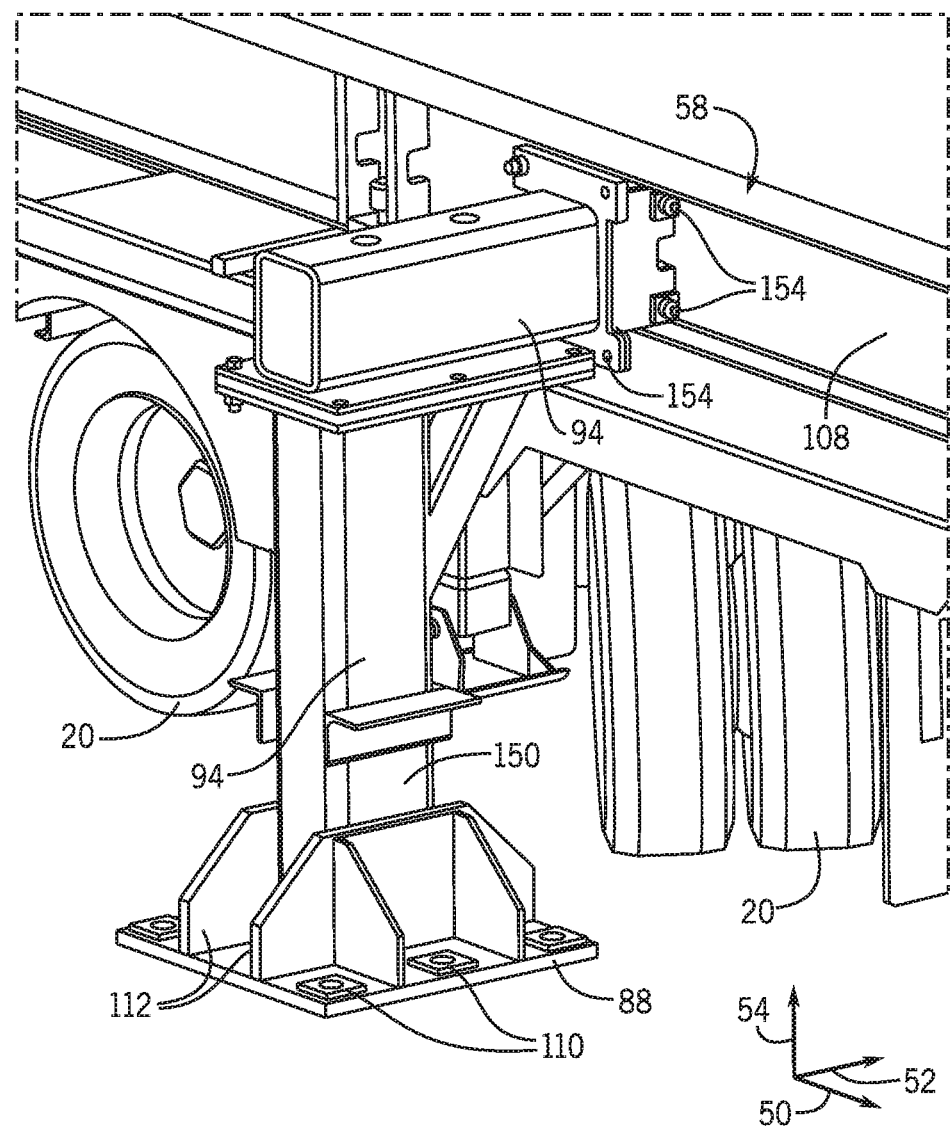
FIG. 6 is a perspective view of an embodiment of a fastened restraint of the restraint assembly.

FIG. 6 illustrates a perspective view of an embodiment of the fastened restraints 82. One or more rigid elements 94 of the fastened restraint 82 may be coupled (e.g., fastened, welded) to the anchor plate 88 on the foundation 86. As discussed above, one or more fasteners 110 couple the anchor plate 88 to the foundation 86. A first rigid element 150 of the fastened restraint 82 may be coupled to the anchor plate 88 and/or to flanges 112 of the anchor plate 88. A second rigid element 152 of the fastened restraint 82 may couple to the first rigid element 150 and fasten to one or more structures of the trailer 11 via fasteners 154 at a location on the trailer 11. The fastened restraint 82 may couple to the deck 58, an edge 108 of the deck 58, or the chassis 60 (e.g., wing 106). In some embodiments, the fastened restraint 82 is configured to couple to one or more webs 146 or flanges of the trailer 11, such as a part of the chassis 60 or the deck 58. As discussed above, the fastened restraints 82 may be configured to restrict movement of the trailer 11 along multiple axes (e.g., system axis 50, lateral axis 52, vertical axis 54). In some embodiments, the fastened restraints 82 are coupled to the trailer 11 via fasteners to form fixed joints with the trailer 11.

The fastened restraint 82 may be installed to couple with the trailer 11 during installation of the restraint assembly 28 after the trailer 11 has been arranged at a desired position on the foundation 86. In some embodiments, the fastened restraint 82 may be configured to couple to the trailer 11 near one or more wheels 20 of the trailer 11. In some embodiments of the mobile power plant system 10, the restraint assembly 28 may include multiple fastened restraints 82. For example, the restraint assembly 28 for the turbine trailer 12 may have 1, 2, 3, 4, or more fastened restraints 82 on the sides of the turbine trailer 12 proximate the turbine 22. As illustrated in FIG. 2, the restraint assembly 28 for the turbine trailer 12 may include the two fastened restraints 82 on the sides of the turbine trailer 12 and the axial restraint 132. As discussed herein, the sides of a trailer exclude the axial ends of the trailer, such as the axial end with the gooseneck or the axial end opposite the gooseneck. The one or more of the fastened restraints 82 may be configured to support compressive loads of more than 500, 1000, or 2000 lbs and/or shear loads of more than 500, 1000, or 2000 lbs during the seismic or wind event. In some embodiments, the fastened restraints 82 may be configured to support various loads during the seismic or wind event, such as tensile loads or bending loads. The fastened restraints 82 may be configured to transfer loads from the trailer 11 to the foundation 86. The fastened restraint 82 may facilitate maintaining a respective position of the trailer 11 (e.g., turbine trailer 12) on the one or more foundations at the installation site relative to other trailers 11 at the installation site.

The restraint assembly 28 may include multiple restraints, and the restraints of the restraint assembly 28 may be of different types. Each restraint of the restraint assembly 28 may be configured to transfer one or more types of loads from environmental conditions (e.g., wind, seismic) to the foundation 86. The tensile restraints 80 may be configured to support more tensile loads and/or lighter loads than the fastened restraints 82 and the interface restraints 84. The fastened restraints 82 may be configured to support more shear loads and/or compressive loads than other restraints. Although the restraint assembly 28 is not to be limited to the types and quantities of the restraints shown, FIG. 2 illustrates an embodiment of the mobile power plant system 10 with the restraint assembly 28 having the various types and quantities of the restraints. For example, the restraint assembly 28 may include eight tensile restraints 80 to couple the turbine trailer 12 to the foundation 86, and the restraint assembly 28 may include four tensile restraints 80 to couple the generator trailer 14 to the foundation 86. The restraint assembly 28 may include eight tensile restraints 80 to couple the control house trailer 16 to the foundation 86. Additionally, or in the alternative, the restraint assembly 28 includes two fastened restraints 82 to couple the turbine trailer 12 to the foundation 86, and the restraint assembly 28 includes four interface restraints 84 on the sides of the generator trailer 14 to restrain movement of the generator trailer 14 with respect to the foundation 86. In some embodiments, the restraint assembly includes one of the axial restraints 132 for the turbine trailer 12, and another axial restraint 132 for the generator trailer 14.

Figure 7:
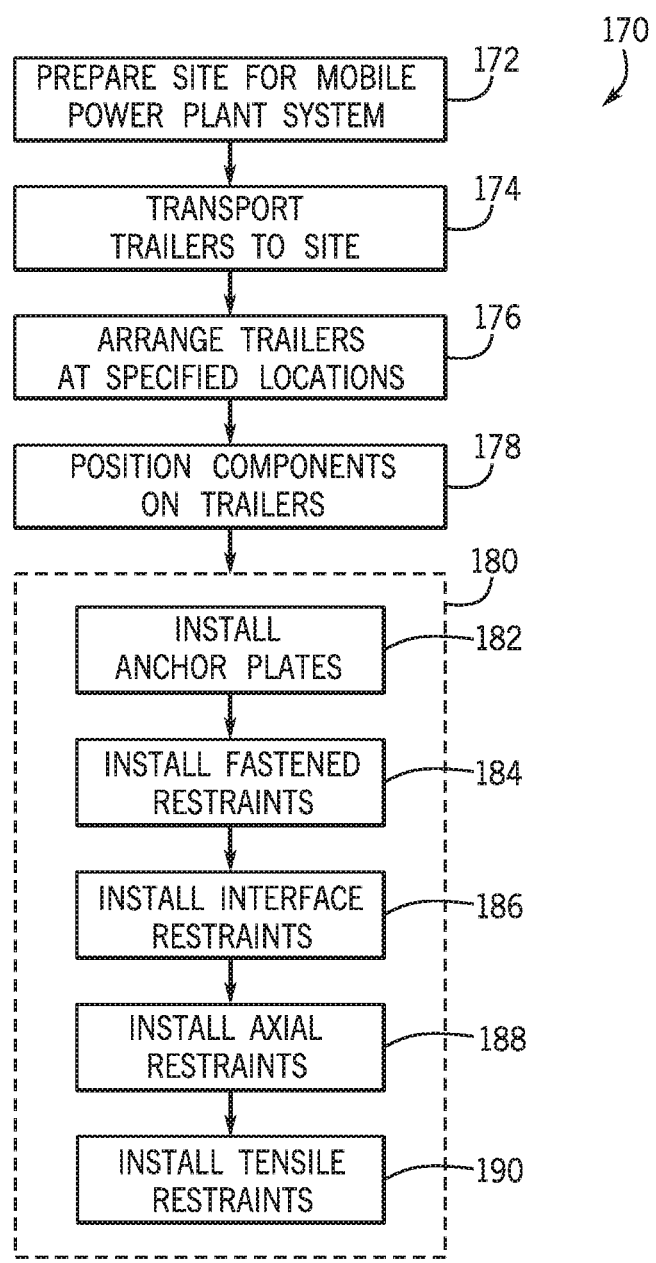
FIG. 7 is an embodiment of a method for installing the mobile power plant assembly with the restraint assembly.

FIG. 7 illustrates an embodiment of a method 170 for installing the restraint assembly 28 to the mobile power plant system 10. The installation site is prepared (block 172) for the mobile power plant system. Preparation may include, but is not limited to, leveling the site and/or establishing the one or more foundations for the site. After the site is prepared, the one or more trailers of the mobile power plant system are transported (block 174) to the site. The one or more trailers may be transported via truck or tractor to the site. In some embodiments, the one or more trailers of the mobile power plant system are transported via aircraft to a place near the site. A truck or tractor may then complete the transportation (block 174) to the site. In some embodiments, the one or more trailers are restrained within an aircraft via restraints coupled to multiple locations on the one or more trailers. In some embodiments, the restraints of the restraint assembly 28 are configured to couple to one or more of the same locations (e.g., existing features) utilized during transportation via aircraft.

After the trailers are transported to the site, the trailers are arranged (block 176) at specified positions on the one or more foundations at the site relative to one another. For example, the turbine trailer and the generator trailer may be arranged to align the generator along the trailer axis 72 through the turbine of the turbine trailer. Additionally, the control house trailer may be arranged at a specified position relative to the turbine trailer and the generator trailer. One or more trailers may be installed on each foundation at the site. In some embodiments, there may be one foundation for all of the trailers of the mobile power system. In some embodiments, there may be a separate foundation for each trailer of the mobile power system to be installed at the site. The components of the trailers may be positioned (block 178) on the appropriate trailers. For example, one or more components disposed on the turbine trailer during operation of the turbine may be disposed on the generator trailer or the control house trailer during transport of the trailers. These components may be repositioned on the appropriate trailers.

After the trailers are arranged at their specified positions on the one or more foundations, the restraint assembly may be utilized to maintain the trailers of the mobile power plant system at their specified positions on the one or more foundations despite high wind and/or seismic events. To install (block 180) the restraint assembly, the anchor plates are fastened (block 182) to the one or more foundations. In some embodiments, the restraint assembly may be installed on new mobile power plant systems prior to operation at the site. In some embodiments, the restraint assembly may be utilized with existing mobile power plant systems, such that the restraint assembly is installed as a retrofit of the mobile power plant system. To install (block 180) the restraint assembly, the one or more fasteners for each anchor plate may be inserted into or through the one or more foundations of the site. The fastened restraints of the restraint assembly are coupled (block 184) to the respective anchor plates and fastened to locations of the respective trailer via fasteners. In some embodiments, the fastened restraints are welded to locations of the respective trailer. The fastened restraints may be positioned to fasten with locations on the chassis or deck of the trailers. For example, two fastened restraints may be fastened to locations on opposite sides of the turbine trailer near the turbine. The interface restraints of the restraint assembly are installed (block 186) by coupling the interface restraints to the respective anchor plates and positioning the interface restraints to interface with locations of the respective trailer. The interface restraints may be positioned to interface with locations on the sides of the chassis or deck of the trailers, such as near heavy components of the trailer, near the gooseneck of the trailer, or any combination thereof. For example, four interface restraints may be positioned on both sides of the generator trailer near the generator. The axial restraints of the restraint assembly are installed (block 188) by coupling the axial restraints to the respective anchor plates and positioning the axial restraints to interface with one of the axial ends of the respective trailer. For example, axial restraints of the restraint assembly may be positioned on the axial ends of the turbine trailer and the generator trailer under the gooseneck of each trailer.

The tensile restraints of the restraint assembly are coupled (block 190) to respective anchor plates and the trailers via the lashing members of the restraint assembly. In some embodiments, the tensile restraints are installed with tensile loads on the tensile members. The tensile restraints may be configured to couple with locations on the chassis or deck of the trailers, such as at the ends of the trailers. For example, one or more pairs of tensile restraints may be positioned near the goosenecks of each trailer and on the control house trailer. It may be appreciated that the restraints of the restraint assembly may be installed in this order or a different order. For example, the restraints of the restraint assembly may be installed in prescribed order to reduce elastic interactions between the restraints and/or to facilitate similar loads on each restraint or on each type of restraint. In some embodiments, the tensile restraints are installed after the fastened restraints and the interface restraints to reduce or eliminate reinstallation or any tensile restraints. In some embodiments, the load on the tensile restraints of a respective trailer may be approximately equal upon completion of installation of the restraint assembly.

Technical effects of the invention include securing a mobile power plant system to one or more foundations at a site despite certain wind conditions or seismic conditions. The restraint assembly described above may enable the mobile power plant system to satisfy International Building Code requirements for certain wind conditions and/or seismic conditions, thereby increasing the sites at which the mobile power plant system may be installed. Moreover, controlling the relative movement of trailers of the mobile power plant system may help maintain alignment of rotating components and decrease wear on components. Furthermore, maintaining alignment of rotating components may reduce or eliminate fatigue of some components, thereby reducing operating or maintenance costs associated with the mobile power plant system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system comprising:
a restraint assembly configured to restrain at least one trailer of a mobile power plant system, wherein the restraint assembly comprises a plurality of restraints configured to be arranged around the at least one trailer at different axial positions relative to a trailer axis of the at least one trailer,
wherein each of the plurality of restraints is configured to extend downwardly from a first interface with the at least one trailer to a second interface coupled with a foundation supporting wheels of the at least one trailer,
wherein the plurality of restraints is configured to resist movement of the at least one trailer in response to an external load in any direction caused by at least one of wind and seismic conditions,
wherein the plurality of restraints comprises a plurality of different types of restraints configured to be distributed around the at least one trailer based on a load distribution on the at least one trailer, and
wherein the plurality of different types of restraints of the restraint assembly comprises one or more tensile restraints configured to be flexible and loaded in tension between connections with the at least one trailer and the foundation, one or more fastened restraints configured to be rigid between connections with the at least one trailer and the foundation, and one or more interface restraints configured to be rigid between the at least one trailer and the foundation while providing at least one degree of freedom.

2. The system of claim 1, comprising the mobile power plant system having the at least one trailer that includes first and second trailers, wherein the restraint assembly is configured to maintain an orientation of a first axis of a first component disposed on the first trailer relative to a second axis of a second component disposed on the second trailer, the restraint assembly is configured to maintain the first trailer at a first position relative to the foundation, the orientation of the first axis relative to the second axis is a coaxial orientation, the first axis is a first rotational axis of the first component, and the second axis is a second rotational axis of the second component.

3. The system of claim 2, wherein the first component comprises a turbine disposed about a shaft along the first axis, and the second component comprises a generator disposed about a generator shaft along the second axis, wherein the shaft is coupled to the generator shaft.

4. The system of claim 1, wherein each tensile restraint of the one or more tensile restraints comprises:
an anchor plate configured as the second interface coupled to the foundation;
a first end coupled to the anchor plate; and
a second end coupled to a lashing member configured as the first interface at a location on the at least one trailer;
wherein each tensile restraint of the plurality of tensile restraints is configured to support a tensile load between the foundation and the at least one trailer.

5. The system of claim 1, wherein each fastened restraint of the one or more fastened restraints comprises:
an anchor plate configured as the second interface coupled to the foundation; and
a rigid element coupled to the anchor plate and configured to be coupled to a location on the at least one trailer via the first interface, wherein the rigid element is configured to restrict movement of the location along the trailer axis, a vertical axis, and a lateral axis.

6. The system of claim 5, wherein the one or more fastened restraints comprises a fastener configured to couple the rigid element to the location on the at least one trailer.

7. The system of claim 1, wherein each interface restraint of the one or more interface restraints comprises:
an anchor plate configured as the second interface coupled to the foundation; and
a rigid element coupled to the anchor plate and configured to interface with a location on the at least one trailer via the first interface without coupling to the location.

8. The system of claim 1, comprising a plurality of the tensile restraints, a plurality of the fastened restraints, and a plurality of the interface restraints.

9. The system of claim 1, comprising the mobile power plant system having the at least one trailer with a turbine and a generator driven by the turbine.

10. The system of claim 9, wherein the at least one trailer comprises a first trailer supporting the turbine and a second trailer supporting the generator.

11. The system of claim 1, wherein the one or more interface restraints are configured to provide two degrees of freedom.

12. The system of claim 1, wherein the one or more tensile restraints comprise a cable or a strap.

13. The system of claim 1, wherein the plurality of different types of restraints comprises a first restraint type configured to be disposed adjacent a first portion of the load distribution on the at least one trailer and a second restraint type configured to be disposed adjacent a second portion of the load distribution on the at least one trailer, wherein the first portion is relatively heavier than the second portion.

14. The system of claim 13, wherein the first restraint type comprises the one or more tensile restraints, and the second restraint type comprises the one or more fastened restraints and/or the one or more interface restraints.

15. The system of claim 1, wherein the different types of restraints comprise first and second restraint types, the first restraint type is configured to support more tensile loads or lighter loads than the second restraint type, and the second restraint type is configured to support more shear loads or compressive loads than the first restraint type.

16. The system of claim 15, wherein the first restraint type comprises the one or more tensile restraints, and the second restraint type comprises the one or more fastened restraints and/or the one or more interface restraints.

17. The system of claim 13, comprising the at least one trailer having a turbine or a generator disposed on the at least one trailer, wherein the turbine or the generator represents the first portion of the load distribution.

18. The system of claim 13, wherein the first restraint type is disposed at a first end portion of the at least one trailer and the second restraint type is disposed at a second end portion of the at least one trailer.

19. The system of claim 1, wherein the plurality of tensile restraints comprises a plurality of sets of tensile restraints, wherein each of the sets of tensile restraints has first and second tensile restraints configured to be angled away from one another from the at least one trailer toward the foundation.

20. The system of claim 1, wherein the plurality of restraints comprises at least one set of four restraints configured to be arranged in an X-shaped pattern between the at least one trailer and the foundation, the X-shaped pattern comprises a first V-shaped pattern of two restraints on a first side of the at least one trailer and a second V-shaped pattern of two restraints on a second side of the at least one trailer, and the first and second sides are opposite from one another.

21. The system of claim 1, wherein at least one of the plurality of restraints is configured to be disposed at or between adjacent wheels of the at least one trailer.

\* \* \* \* \*